United States Patent
Thomas et al.

(10) Patent No.: US 8,355,379 B2
(45) Date of Patent: Jan. 15, 2013

(54) HANDOVER BETWEEN RADIO NETWORKS

(75) Inventors: Howard J. Thomas, Cirencester (GB); Stephen J. Barrett, Curridge (GB)

(73) Assignee: Motorola Solutions, Inc., Schaumburg, IL (US)

( * ) Notice: Subject to any disclaimer, the term of this patent is extended or adjusted under 35 U.S.C. 154(b) by 725 days.

(21) Appl. No.: 12/278,284

(22) PCT Filed: Jan. 29, 2007

(86) PCT No.: PCT/US2007/061208
§ 371 (c)(1),
(2), (4) Date: Aug. 5, 2008

(87) PCT Pub. No.: WO2007/098307
PCT Pub. Date: Aug. 30, 2007

(65) Prior Publication Data
US 2009/0069013 A1 Mar. 12, 2009

(30) Foreign Application Priority Data
Feb. 16, 2006 (GB) .................................. 0603063.9

(51) Int. Cl.
*H04B 7/212* (2006.01)
(52) U.S. Cl. ........ 370/331; 370/329; 370/334; 370/337; 455/436; 455/422.1
(58) Field of Classification Search .................. 455/412, 455/414.11, 453, 557, 564, 466, 572, 552, 455/435.2, 439, 574; 370/331, 401, 466
See application file for complete search history.

(56) References Cited

U.S. PATENT DOCUMENTS

| 2002/0006792 | A1 | 1/2002 | Usher et al. |
| 2003/0114158 | A1* | 6/2003 | Soderbacka et al. .......... 455/436 |
| 2004/0017798 | A1 | 1/2004 | Hurtta et al. |
| 2004/0266435 | A1* | 12/2004 | de Jong et al. ................ 455/436 |
| 2005/0075074 | A1* | 4/2005 | Benson et al. ............. 455/67.11 |
| 2006/0084440 | A1* | 4/2006 | Bakri ............................ 455/439 |

FOREIGN PATENT DOCUMENTS

| GB | 2306277 A | 4/1997 |
| WO | 02089514 A1 | 11/2002 |

(Continued)

OTHER PUBLICATIONS

Korean Application No. 10-2008-7022452—Translation of Preliminary Rejection, Aug. 6, 2010—2 pages.

(Continued)

*Primary Examiner* — Anez Ebrahim

(57) ABSTRACT

A communication system (100) comprises a core network (109) for routing data to and from radio networks. A first radio network supports a first air interface standard (e.g. UMTS) and comprises a first controller, such as an RNC (107), which can receive a handover preference message from the core network (109) and which can determine a handover in response to the handover preference message. The second radio network supporting a second air interface standard (e.g. GSM) and comprises a second controller, such as a BSC 111, which can receive the handover preference message from the core network (109) and which can determine a handover in response to the handover preference message. An interlayer handover controller sets a handover preference indication such that the first controller biases handover decisions towards a remote station being supported by the first radio network and the second controller biases handover decisions towards the remote station being supported by the second radio network.

7 Claims, 2 Drawing Sheets

FOREIGN PATENT DOCUMENTS

WO     2005099185 A1    10/2005

OTHER PUBLICATIONS

Chinese Application No. 200780005814.2—Translation of 1st Office Action, Mar. 24, 2011—8 pages.
English translation of 2nd Office Action dated Aug. 24, 2011 in related China application 200780005814.2.
English translation of 3rd Office Action dated Feb. 13, 2012 in related China application 200780005814.2.
Search Report mailed on Jun. 13, 2006 in Great Britain Application No. GB0603063.9.
International Search Report and Written Opinion for International Patent Application No. PCT/US07/61208 mailed on Dec. 18, 2007.
International Preliminary Report on Patentability and Written Opinion for International Patent Application No. PCT/US2007/061208 mailed on Aug. 28, 2008.

* cited by examiner

HANDOVER BETWEEN RADIO NETWORKS

FIELD OF THE INVENTION

The invention relates to handover between radio networks and in particular, but not exclusively, to handover between Global System for Mobile communication (GSM) and Universal Mobile Telecommunication System (UMTS) radio networks.

BACKGROUND OF THE INVENTION

Currently, the most ubiquitous cellular communication system is the 2nd generation communication system known as the Global System for Mobile communication (GSM). Further description of the GSM TDMA communication system can be found in 'The GSM System for Mobile Communications' by Michel Mouly and Marie Bernadette Pautet, Bay Foreign Language Books, 1992, ISBN 2950719007.

3rd generation systems have recently been rolled out in many areas to further enhance the communication services provided to mobile users. One such system is the Universal Mobile Telecommunication System (UMTS), which is currently being deployed. Further description of CDMA and specifically of the Wideband CDMA (WCDMA) mode of UMTS can be found in 'WCDMA for UMTS', Harri Holma (editor), Antti Toskala (Editor), Wiley & Sons, 2001, ISBN 0471486876. The core network of UMTS is built on the use of SGSNs and GGSNs thereby providing commonality with GPRS.

As a mobile station moves, it may move from the coverage of one base station to the coverage of another, i.e. from one cell to another. As the mobile station moves towards a base station, it enters a region of overlapping coverage of two base stations and within this overlap region it changes to be supported by the new base station. As the mobile station moves further into the new cell, it continues to be supported by the new base station. This is known as a handover or handoff of a mobile station between cells.

As an increasing number of communication systems, such as GSM, UMTS, Wireless Local Area Network (WLAN etc), are introduced mobile stations are being deployed which are capable of accessing different communication systems. Indeed, the variety of systems has led to a design philosophy where interworking between different communication systems and air interface standards has become a priority. Indeed, the different radio access standards and technologies are often viewed as different radio access networks of a combined hybrid communication system having a common or interfaced core network. These different radio access networks or air interface standards are often referred to as different access layers.

In order to achieve efficient interworking between different radio access technologies, handover of communication services between these has become increasingly important. For example, a mobile station may comprise both GSM and UMTS functionality and may handover an ongoing call from a GSM RAN to a UMTS RAN or vice versa. Such interlayer handover may provide enhanced communication services and an improved user experience. However, the interlayer handover requires complex management procedures. Also, the different RANs have different characteristics and the characteristics of the service provided to the mobile station are typically dependent on the RAN currently supporting the service.

Thus, in mobile communications systems, different access layers may have different capabilities and may support some services better than others. To deal with this issue, the $3^{rd}$ Generation Partnership Project (3GPP) Technical Specifications provide for a Service Handover mechanism between GSM and UMTS. The handover mechanism seeks to define an access layer preference for a communication service such that for a given service it is defined which access layer the service is preferably supported by. Hence, the service is supported by the preferred access layer if this is possible and the alternative layer is only used if the preferred layer cannot support the service.

Specifically, for GSM and UMTS, handovers are managed within the serving RAN based on the conditions of the individual mobile station. However, the service itself is set up and controlled by the core network and the RAN has only information of the characteristics of the radio bearers supporting the service but not of the characteristics of the service itself.

Accordingly, 3GPP have introduced an access layer preference in the Handover Service Information Element which is an information element communicated from the Core Network to the RAN. For a GSM RAN, the access layer preference has the following states for a given service:

Unset—no preference is indicated.
There is no preference for the service for any access layer.
Should handover to UMTS.
If possible the service should be handed over to the UMTS access layer. The GSM RAN hands the service over to UMTS if the radio conditions allow this.
Should not handover to UMTS
If possible the service should be continued to be supported by the GSM RAN. The service is only handed over to UMTS if the radio conditions require this to continue to support the service.
Shall not handover to UMTS.
The service must be supported by the GSM RAN or dropped. The service cannot be handed over to UMTS.

The Handover Service Information Element sent from the core network to the UMTS RAN comprises the following settings:

Unset—no preference is indicated.
There is no preference for the service for any access layer.
Should handover to GSM.
If possible the service should be handed over to the GSM access layer. The UMTS RAN hands the service over to GSM if the radio conditions allow this.
Should not handover to GSM
If possible the service should be continued to be supported by the UMTS RAN. The service is only handed over to GSM if the radio conditions require this to continue to support the service.
Shall not handover to GSM.
The service must be supported by the UMTS RAN or dropped. The service cannot be handed over to GSM.

Thus, the Handover Service Information Element allows the RANs to perform handovers such that a given service is supported by the preferred access layer whenever possible. However, although this may provide advantages in many situations, it does not provide optimal performance in all conditions or for all services and in particular it may result in large handover overheads, reduced user quality and increased resource usage.

Hence, an improved handover would be advantageous in many scenarios.

SUMMARY OF THE INVENTION

Accordingly, the Invention seeks to preferably mitigate, alleviate or eliminate one or more of the above mentioned disadvantages singly or in any combination.

According to a first aspect of the invention there is provided a communication system comprising: a core network for routing data to and from radio networks; a first radio network supporting a first air interface standard and comprising first means for receiving a handover preference message from the core network and for determining a handover in response to the handover preference message; a second radio network supporting a second air interface standard and comprising second means for receiving the handover preference message from the core network and for determining a handover in response to the handover preference message; and setting means for setting a handover preference indication of the handover preference message such that the first means biases handover decisions towards a remote station being supported by the first radio network and the second means biases handover decisions towards the remote station being supported by the second radio network.

The invention may allow improved performance in a cellular communication system and may in particular allow the number of handovers between radio networks supporting different air interfaces to be reduced. For example, some services can be served equally well by different radio access layers and the end user quality may be best served by reducing or minimizing handovers and especially interlayer handovers. The invention specifically allows an optimization by allowing the remote station not to have a preference for a specific radio network but rather to have a preference for not performing interlayer handovers.

The core network may comprise a single network or may be a hybrid network comprising a plurality of networks such as a UMTS Core Network and the Internet.

The handover preference message may be communicated to a radio network when a handover to that radio network is initiated. The first means may determine if a handover should be performed from the first to the second radio network in situations where the remote station is supported by the first radio network. The second means may determine if a handover should be performed from the second to the first radio network in situations where the remote station is supported by the second radio network.

The handover of the remote station may be fully or partly. For example, the handover determination may relate to all services and radio bearers supported for the remote station or may relate to only one or some of the services or radio bearers supported for the remote station.

According to an optional feature of the invention, the handover preference indication comprises a common setting for the first and second radio network, the setting being indicative of a current radio network preference.

This may facilitate operation and/or implementation and may provide for a facilitated and efficient way of reducing handovers. The same setting may directly indicate that the first and/or second means should try not to handover to another radio network.

According to an optional feature of the invention, the system comprises forwarding means for forwarding the handover preference message from the first radio network to the second radio network without modifying the handover preference indication.

This may facilitate operation and/or implementation and may provide for a facilitated and efficient way of reducing handovers.

According to an optional feature of the invention, the forwarding means is arranged to forward the handover preference message to the second radio network in response to a decision to handover the remote station from the first radio network to the second radio network.

The decision may be to handover the remote station from the first to the second radio network. This may allow efficient performance and/or facilitated handover operation.

According to an optional feature of the invention, the setting means is arranged to set the handover preference indication in response to which of the first radio network and the second radio network the handover preference message is forwarded to.

This may facilitate operation and/or implementation and may provide for a facilitated and efficient way of reducing handovers. The feature may e.g. allow improved compatibility with other operations in a cellular communication system and may e.g. reduce the requirement for modifications of existing equipment, e.g. in the radio networks.

According to an optional feature of the invention, the setting means comprises: means for receiving the handover preference message from the first radio network, the handover preference indication having a preference indication for the first radio network; means for setting the handover preference indication of the handover preference message to a preference for the second radio network; and means for forwarding the handover preference message to the second radio network.

This may improve performance and/or facilitate operation and/or implementation and may provide for a facilitated and efficient way of reducing the number of handovers.

According to an optional feature of the invention, the first means is arranged to forward the handover preference message to the setting means in'response to a decision to handover the remote station from the first radio network to the second radio network.

This may facilitate operation and/or implementation and may provide for a facilitated and efficient way of reducing handovers. The decision may be to handover the remote station from the first to the second radio network.

According to an optional feature of the invention, the first means is arranged to determine if a handover is needed in response to a first criterion for a first setting of the handover preference indication and in response to a different criterion for a different setting of the handover preference indication.

This may improve performance and/or facilitate operation and/or implementation. The criteria may for example differ in considering different parameters and/or may e.g. differ in using different decision thresholds. For example, the first criterion may be a load criterion and the different criterion may be a measure of radio link quality on the second system.

According to an optional feature of the invention, the first means is arranged to bias handover decisions towards a remote station being supported by the first radio network by initiating a handover to the second radio network only if a service of the remote station cannot be supported by the first radio network.

This may improve performance and/or facilitate operation and/or implementation.

Similarly, the second means may be arranged to bias handover decisions towards a remote station being supported by the second radio network by initiating a handover only if a service of the remote station cannot be supported by the second radio network.

According to an optional feature of the invention, the first means is located in a fixed Radio Access Network.

This may improve performance and/or facilitate operation and/or implementation.

According to an optional feature of the invention, the first means is located in the remote station and the first radio network comprises means for transmitting the handover preference message to the remote station over an air interface of the first radio network.

This may improve performance and/or facilitate operation and/or implementation.

According to an optional feature of the invention, the first radio network is a Radio Access Network selected from the group of: a second generation cellular communication system Radio Access Network; a third generation cellular communication system Radio Access Network; a Wireless Local Area Network; a GSM Radio Access Network; and a UMTS Radio Access Network.

The invention may allow improved performance and/or facilitate operation and/or implementation for communication systems comprising the above referenced Radio Access Networks.

According to an optional feature of the invention, the second radio network is a different Radio Access Network than the first radio network and is selected from the group of: a second generation cellular communication system Radio Access Network; a third generation cellular communication system Radio Access Network; a Wireless Local Area Network; a GSM Radio Access Network; and a UMTS Radio Access Network.

The invention may allow improved performance and/or facilitate operation and/or implementation for communication systems comprising two of the above referenced Radio Access Networks.

According to an optional feature of the invention, the core network comprises a cellular communication system core network.

The invention may allow improved performance and/or facilitate operation and/or implementation for communication systems including a cellular communication system core network such as a UMTS core network.

According to an optional feature of the invention, the setting means is comprised in the core network.

This may improve performance and/or facilitate operation and/or implementation. The setting means may generate the handover preference message in response to a call or service event, such as a call or service setup or handover.

According to an optional feature of the invention, the first means is arranged to determine a handover for a service in response to a nominal handover preference if no handover preference message is received for the service.

This may improve performance and/or facilitate operation and/or implementation. In particular, it may provide improved performance for services not having an explicit handover preference.

According to an optional feature of the invention, the nominal handover preference for a service type is determined in response to at least one characteristic of a radio access bearer supporting the service type.

This may improve performance and/or facilitate operation and/or implementation. In particular, it may allow an assessment of a suitable preference based on information available in the first radio network.

According to an optional feature of the invention, possible values of the handover preference indication furthermore comprise at least one value selected from the group of: a handover preference for the second radio network; a handover preference for the first radio network; and an indication that handover to the second radio network is not allowed.

This may improve performance and/or facilitate operation and/or implementation.

According to an optional feature of the invention, the handover preference message comprises a $3^{rd}$ Generation Partnership Project Service Handover Information Element.

This may improve performance and/or facilitate operation and/or implementation. In particular, the invention may provide improved performance in a 3GPP cellular communication system and/or may provide enhanced compatibility with such systems.

The Service Handover Information Element may be comprised in the Assignment Command, UTRAN Cell Change Order or Handover Command (for $2^{nd}$ Generation systems) or the RAB Assignment Command or Relocation Request Message (for $3^{rd}$ Generation system).

According to another aspect of the invention, there is provided a communication system having a core network for routing data to and from radio networks, a first radio network supporting a first air interface standard and comprising first means for receiving a handover preference message from the core network and for determining a handover in response to the handover preference message and a second radio network supporting a second air interface standard and comprising second means for receiving the handover preference message from the core network and for determining a handover in response to the handover preference message; the method comprising setting a handover preference indication of the handover preference message such that the first means biases handover decisions towards a remote station being supported by the first radio network and the second means biases handover decisions towards the remote station being supported by the second radio network.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to a communication system having a Core Network (CN) interconnecting a GSM and a UMTS Radio Access Network. However, it will be appreciated that the invention is not limited to this application but may be applied to many other communication systems and other radio networks.

Figure 1:
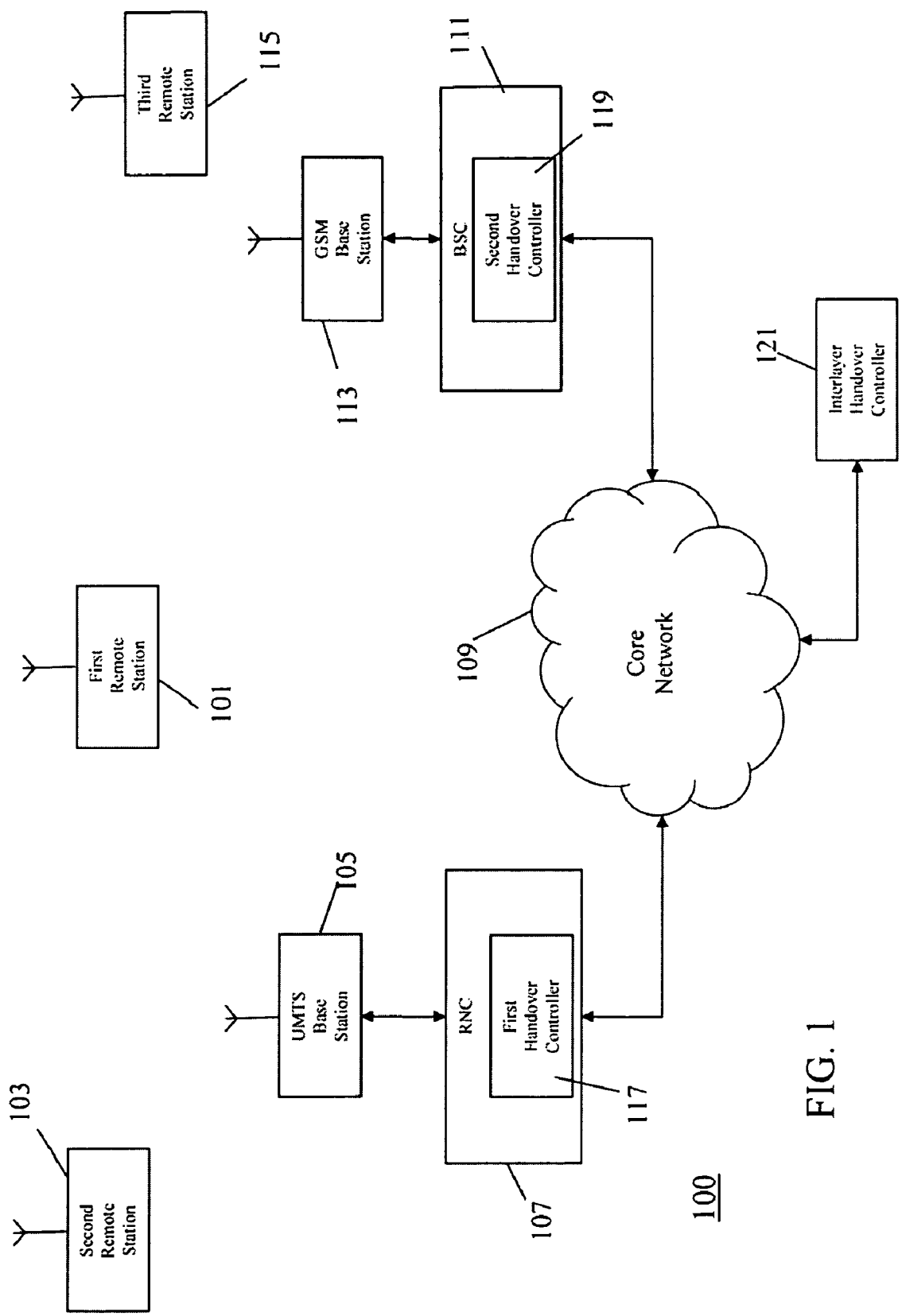
FIG. 1 illustrates an example of a communication system in accordance with some embodiments of the invention.

FIG. 1 illustrates an example of a communication system 100 in accordance with some embodiments of the invention.

In a cellular communication system, a geographical region is divided into a number of cells each of which is served by a base station. The base stations are interconnected by a fixed network which can communicate data between the base stations. A remote station (e.g. a User Equipment (UE) or a mobile station) is served via a radio communication link by the base station of the cell within which the remote station is situated.

As a remote station moves, it may move from the coverage of one base station to the coverage of another, i.e. from one cell to another. As the remote station moves towards a base station, it enters a region of overlapping coverage of two base stations and within this overlap region it changes to be supported by the new base station. As the remote station moves further into the new cell, it continues to be supported by the new base station. This is known as a handover or handoff of a remote station between cells.

A typical cellular communication system extends coverage over typically an entire country and comprises hundreds or even thousands of cells supporting thousands or even millions of remote stations. Communication from a remote station to a base station is known as uplink, and communication from a base station to a remote station is known as downlink.

In the example of FIG. 1, a first remote station 101 and a second remote station 103 are in a first cell supported by a first base station 105. The first base station 105 is specifically a UMTS base station (a Node B) which is part of a UMTS RAN.

The first base station 105 is coupled to a first RNC 107 which is also part of the UMTS RAN. An RNC performs many of the control functions related to the air interface including radio resource management and routing of data to and from appropriate base stations.

The first RNC 107 is coupled to a Core Network (CN) 109. A CN interconnects different RANs and can interconnect different sections of a RAN such as different UMTS RNCs. The CN 109 is operable to route data between any two RANs, thereby enabling a remote station in one RAN to communicate with a remote station in another RAN. In addition, a core network comprises gateway functions for interconnecting to other networks such as the Public Switched Telephone Network (PSTN), thereby allowing remote stations to communicate with landline telephones and other communication terminals connected by a landline. Furthermore, the CN comprises much of the functionality required for managing a conventional cellular communication network including functionality for routing data, admission control, resource allocation, subscriber billing, remote station authentication etc.

In FIG. 1, the core network 109 is further coupled to a GSM Base Station Controller (BSC) 111 which is part of a GSM RAN. A BSC performs many of the control functions related to the air interface including radio resource management and routing of data to and from appropriate base stations. The BSC 111 is coupled to a GSM base station 113. The GSM station 113 supports a third remote station 115.

Thus, the communication system of FIG. 1 supports a plurality of different air interface technologies and standards through different radio networks (a radio network may be considered to comprise a RAN and the remote stations operating or capable of operating with the RAN). The different radio networks supporting different air interface standards are often referred to as different access layers of the communication system.

In a hybrid communication system, such as the communication system of FIG. 1, it is advantageous that remote stations can handover not only within a given air interface technology or radio network but also between different air interface technologies and radio networks. For example, most UMTS remote stations also comprise functionality for communicating using the GSM air interface standard. Indeed, UMTS is initially deployed to provide islands of coverage with the wider coverage being supported by GSM.

In FIG. 1, the first remote station 101 comprises both functionality for communicating over a GSM air interface and functionality for communicating over a UMTS air interface. This, the first remote station can be supported both by the UMTS RAN and the GSM RAN.

The communication system of FIG. 1 comprises functionality that allows a service of the first remote station 101 to be handed over from the UMTS RAN to the GSM RAN and vice versa.

Interlayer handover is in a hybrid GSM and UMTS communication system controlled within the network element controlling the base stations (i.e. the RNC or BSC). Specifically, the RNCs and BSCs receive measurement reports from the remote stations supported by the network element. The measurement reports include signal quality measurements relating to both neighbouring base stations in the same access layer as well as base stations in the other access layers. The RNC/BSC currently supporting the remote station evaluates these measurement reports and decides if a handover to another base station of the same or a different access layer should be performed. This determination is performed by the individual network element without information from or interaction with the other radio network.

In the specific example of FIG. 1, the RNC 107 comprises a first handover controller 117 and the BSC 111 comprises a second handover controller 119. The first handover controller 117 receives measurement reports from all the remote stations that are supported by UMTS base stations 105 controlled by the RNC 107. In response, the first handover controller 117 determines if a handover should be performed for the individual remote station. Similarly, the second handover controller 119 receives measurement reports from all the remote stations which are supported by GSM base stations 113 controlled by the BSC 111. In response, the second handover controller 119 determines if a handover should be performed for the individual remote station.

The first handover controller 117 can specifically determine if a handover from the UMTS RAN to the GSM RAN should be performed and the second handover controller 119 can specifically determine if a handover from the GSM RAN to the UMTS RAN should be performed.

Some services may be better supported in one access layer than in another access layer. For example, UMTS may provide a higher throughput data rate than GSM and some video services may e.g. provide a higher video quality by exploiting the higher data rate for a UMTS RAN.

Accordingly, the UMTS and GSM systems allow a specific access layer to be selected as a preferred access layer for a given service of a remote station. For example, when a video service is set up, a preference for UMTS may be registered. This preference is then communicated to the handover controller currently supporting the remote station by a Service Handover Information Element which is communicated from the CN 109 to the handover controller Thus, if the preference is for the UMTS access layer, the first handover controller 117 will not perform a handover to the GSM RAN unless this is necessary in order to support the service. However, if the remote station is supported by the GSM radio network, the second handover controller 119 will seek to handover the remote station to the UMTS RAN if at all possible.

Figure 2:
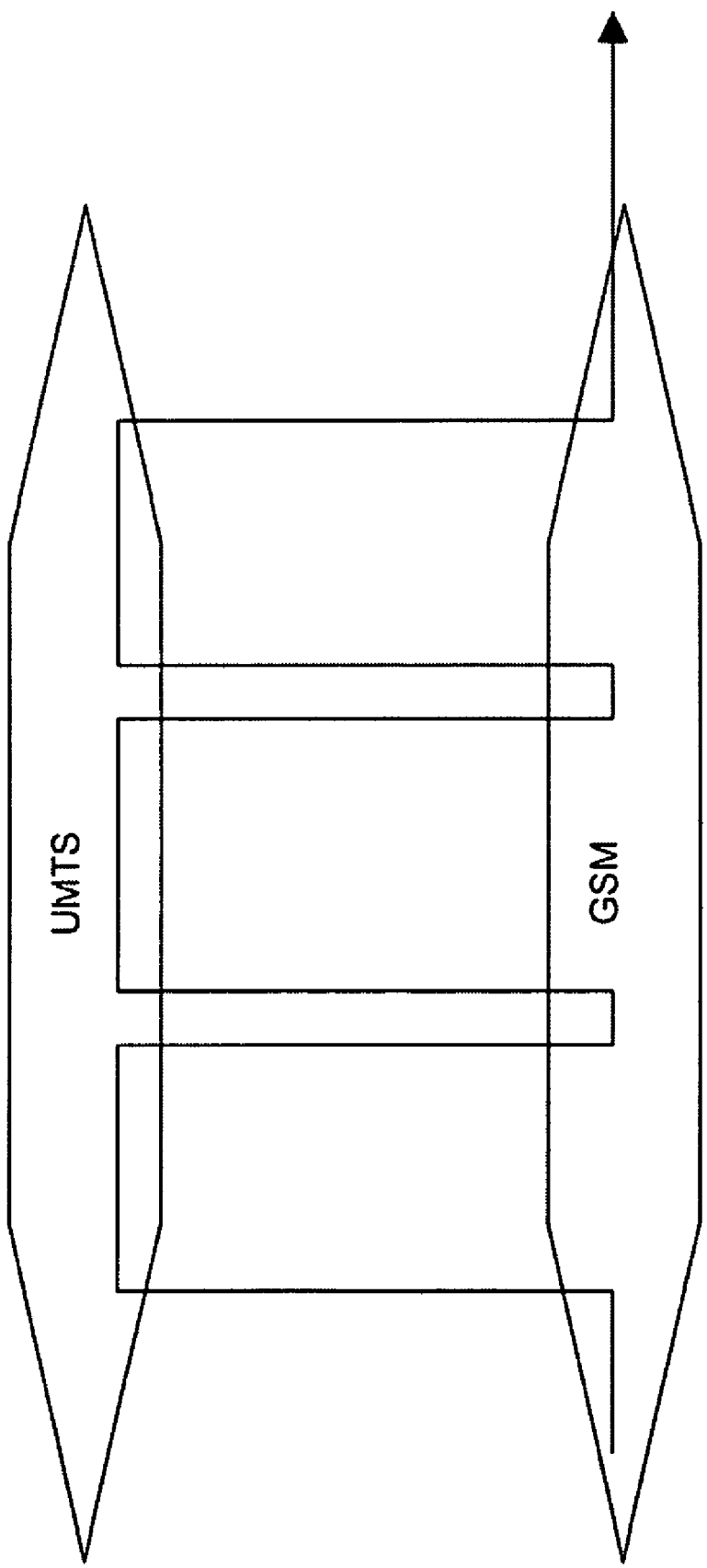
FIG. 2 illustrates an example of a handover sequence between a UMTS and GSM radio network.

However, although this approach may bias the remote station towards the desired RAN it also has a number of disadvantages. Specifically, as illustrated in FIG. 2, if the conditions for the preferred access layer are close to the limit at which the service can be supported, the variations in the radio environment can cause the remote station to repeatedly be handed over between the UMTS and the GSM RAN. This ping-pong effect is highly disadvantageous for many services and results in an increased operational complexity and resource usage. Furthermore, as handovers tend to be a critical operation, the dropped call rate may increase. Accordingly, a reduced end user quality is often experienced.

The communication system of FIG. 1 comprises an interlayer handover controller 121 which is arranged to communicate with the first handover controller 117 and the second handover controller 119 and thereby to control or bias the operation of these controllers.

Specifically, the interlayer handover controller 121 is arranged to transmit a handover preference message to the first and second handover controllers 117, 119. The handover preference message can specifically be a Service Handover Information Element. The Service Handover Information Element can for example be transported in different messages defined by the UMTS and the GSM specifications. Specifically, the Service Handover Information Element can be sent to the first handover controller 117 by including it in the RAB Assignment Command or Relocation Request Message defined in UMTS Technical Specification TS 25.413. The Service Handover Information Element can be sent to the second handover controller 119 by including it in the Assignment Command, UTRAN Cell Change Order or Handover Command as defined in GSM Recommendations 48.008 and 48.018.

The interlayer handover controller 121 is arranged to set a handover preference indication of the Service Handover Information Element. However, in contrast to existing systems the preference indication is not set to indicate a preference for a specific access layer or radio network but is rather set to indicate a preference for a reduction or minimisation of interlayer handovers.

Thus, the first handover controller 117 and the second handover controller 119 are arranged such that they perform the handover determination in response to the handover preference indication of the Service Handover Information Element. The interlayer handover controller 121 sets the handover preference indication such that the first handover controller 117 biases handover decisions towards the remote station 101 being supported by the UMTS RAN and such that the second handover controller 119 biases handover decisions towards the remote station 101 being supported by the GSM radio network. Thus, the interlayer handover controller 121 controls the system such that it exhibits a preference for whichever access layer the first remote station 101 is currently supported by rather than for a specific access layer.

Accordingly, the interlayer handover controller 121 reduces the number of interlayer handovers that are initiated for the service. This is highly advantageous for some services and may substantially improve the experienced end user quality. For example, some services, such as a voice call experience the same quality of service regardless of whether the service is supported by a GSM or UMTS RAN. For such services, an improved quality is experienced by a reduction in the number of handovers.

In some embodiments, the handover preference indication comprises a common setting for the UMTS and GSM radio network which indicates to the handover controller 117, 119 that the handover preference is for the service to remain on the current radio network whichever this one may be.

Specifically, in accordance with the specifications for UMTS and GSM, the Service Handover Information Element can comprise a three bit handover preference indication which conventionally can comprise the following possible settings when sent to a GSM RAN:

000 Prefer UMTS (the second handover controller 119 will hand the service over to UMTS if possible).
    001 Should not handover to UMTS (the second handover controller 119 will only hand the service over to UMTS if necessary).
    010 Shall not handover to UMTS (the second handover controller 119 will not hand the service over to UMTS).

Similarly, when sent to a UMTS RAN, the Service Handover Information Element can comprise a three bit handover preference indication with the following possible settings 000 Prefer GSM (the first handover controller 117 will hand the service over to GSM if possible).
    001 Should not handover to GSM (the first handover controller 117 will only hand the service over to GSM if necessary).
    010 Shall not handover to GSM (the first handover controller 117 will not hand the service over to GSM).

Although the message is defined as a three bit message only two bits are currently used and the leading bit is always set to "0". However, it will be appreciated that the described approach is not limited to this specific case.

In some embodiments, the Service Handover Information Element is enhanced to further comprise the setting 011 Prefer to stay on current radio network This setting is common for GSM and UMTS and in response both the first and the second handover controller 117, 119 will bias the handover decisions towards the currently supporting radio network.

As a specific example, both of the handover controllers 117, 119 can be arranged to adapt different handover criteria depending on the preference indication of the Service Handover Information Element. The handover controller 117, 119 which is currently supporting the remote station 101 can evaluate measurement reports received from the remote station 101 and can apply the selected criterion. For example, when a new service is set up or handed over to the GSM RAN, a handover preference message in the form of a Service Handover Information Element is transmitted to the first handover controller 117.

The first handover controller 117 checks if the handover preference indication corresponds to 000 in which case it proceeds to apply a criterion which determines if the UMTS RAN can possibly support the service. If so, a handover is initiated.

If the handover preference indication does not correspond to 000, the first handover controller 117 checks if the handover preference indication corresponds to 001 in which case it proceeds to apply a criterion which determines if the GSM RAN can possibly support the service. Only if this is not the case is a handover initiated.

If the handover preference indication does not correspond to 000 or 001, the first handover controller 117 checks if the handover preference indication corresponds to 010 in which case it does not initiate a handover in any circumstance.

If the handover preference indication does not correspond to any of the previous settings, the first handover controller 117 checks if the handover preference indication corresponds to 011 in which case it proceeds to apply a criterion which determines if the GSM RAN can possibly support the service. Only if this is not the case is a handover initiated. Thus, in this case the first handover controller 117 only initiates a handover if this is necessary and thereby reduces or minimizes the number of interlayer handovers.

Although the settings 001 and 010 can result in the same operation being performed by the first handover controller 117, the meaning of the two settings is different and are treated differently in the system. For example, if a remote station is supported by the GSM RAN, the setting 001 indicates a preference of the service for the GSM RAN. If the remote station is then handed over from the GSM to the UMTS RAN, the Service Handover Information Element is forwarded to the UMTS RAN with a setting of 000 in order for the second handover controller 119 to operate in accordance with the preference for the GSM RAN. Accordingly, the second handover controller 119 will seek to handover this service to the GSM RAN as soon as this is feasible.

In contrast, the setting 010 will be forwarded unchanged to the UMTS RAN and will be interpreted by the second handover controller 119 as a preference for UMTS and accordingly the second handover controller 119 will only hand over to GSM if it is not feasible to support the service on UMTS.

Thus, the handover preference message can be forwarded directly from the first radio network to the second radio network without modifying the handover preference indication resulting in a preference for a minimisation of the number of handovers.

This forwarding of the handover preference message from a first radio network to a second radio network can specifically be performed when a service is handed over from the first radio network to the second radio network.

In some embodiments, the handover preference indicator can be set to reflect an access layer preference depending on which of the first radio network and the second radio network the handover preference message is forwarded to (e.g. when a service is handed over from one radio access network to another). Specifically the interlayer handover controller 121 can set the handover preference indicator depending on which radio network is being handed over to. In contrast to existing approaches, the setting introduced by the interlayer handover controller 121 is not such that a preference for specific access layer of radio network is introduced but rather is set such that the number of interlayer handovers is reduced or minimised.

As a specific example, the first remote station 101 may be served by the GSM RAN. The second handover controller 119 may determine that the first remote station 101 cannot continue to be supported by the GSM RAN and a handover to the UMTS RAN is initiated. The Service Handover Information Element can accordingly be transmitted from the second handover controller 119 to the interlayer handover controller 121. The interlayer handover controller 121 identifies that a handover to the UMTS RAN is underway and accordingly sets the handover preference indication of the Service Handover Information Element to the setting 001 and forwards the message to the first handover controller 117. In response, the first handover controller 117 implements the handover criterion that will bias handover decisions away from a handover and specifically a criterion can be implemented which ensures that the first remote station 101 is only handed over to the GSM RAN if necessary.

It will be appreciated, and although the above description has focused on embodiments where the functionality for deciding upon handovers is located in a fixed RAN, the functionality may be located elsewhere in other embodiments.

For example, in some embodiments the remote stations can comprise functionality for deciding whether a handover should be performed. Specifically, a remote station can evaluate measurement reports from base stations of different radio networks and can therefrom evaluate if the handover should be performed. This determination can follow the principles described for the first handover controller 117 and the second handover controller 119. Specifically, the determination can be made in response to a handover preference indication received in a Service Handover Information Element sent to the remote station from the currently serving base station.

It will also be appreciated that although the above description has focused on handovers between a second generation cellular communication system RAN, in the form of a GSM RAN, and a third generation cellular communication system RAN, in the form of a UMTS RAN, the described principles can be applied to other radio networks and RANs.

Specifically, a radio network can be a Wireless Local Area Network (WLAN) such as a IEEE 802.11x WLAN. In such a case, the core network can be a hybrid network comprising both core network elements of a cellular communication system as well as fixed network elements of the WLAN.

In some embodiments, the handover controllers 117, 119 can estimate a handover preference that can be applied to a service if no explicit handover preference has been received for this. Thus, if no handover preference message has been received by the handover controllers 117, 119 for a specific service, the controllers 117, 119 can apply a nominal handover preference for the service. This nominal handover preference can be estimated in response to one or more characteristics of one or more of the radio bearers which are set up in support of the service. For example, if the service is currently supported by a UMTS RAN radio access bearer having a quality of service requirement that cannot easily be met by GSM, the second handover controller 119 may infer a preference for the UMTS RAN. However, if the parameters of the radio bearer are such that the quality of service requirements can easily be provided by GSM, the second handover controller 119 may infer a preference for a minimisation of handovers.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims does not imply any specific order in which the features must be worked and in particular the order of individual steps in a method claim does not imply that the steps must be performed in this order. Rather, the steps may be performed in any suitable order.

The invention claimed is:

1. A communication system comprising: a core network for routing data between first and second radio networks; the first radio network supporting a first air interface standard and comprising first means for receiving a handover preference message from the core network and for determining a handover in response to the handover preference message; the second radio network supporting a second air interface standard and comprising second means for receiving the handover preference message from the core network and for determining a handover in response to the handover preference message; and setting means for setting a handover preference information element of the handover preference message such that, when the first means and second means receive the same handover preference information element, the first means biases handover decisions towards a remote station being supported by the first radio network and the second means biases handover decisions towards the remote station being supported by the second radio network such that the setting means controls any network in the system, using the same information element, to exhibit a preference to remain attached to an access layer of a radio network currently supporting the remote station instead of handing over in accordance with an interlayer handover preference for a specific access layer in a different radio network, wherein the first means is arranged to bias handover decisions towards a remote station being supported by the first radio network by initiating a handover to the second radio network only if a service of the remote station cannot be supported by the first radio network, and wherein the first means is arranged to determine a handover for a service in response to a nominal handover preference if no handover preference message is received for the service, wherein the nominal handover preference for a service type is determined in response to at least one characteristic of a radio access bearer supporting the service type.

2. The communication system of claim 1 comprising forwarding means for forwarding the handover preference message from the first radio network to the second radio network, without modifying the handover preference information element, in response to a decision to handover the remote station from the first radio network to the second radio network, such that the preference will now be for the remote station to stay on the second radio network.

3. The communication system of claim 1 wherein the setting means is arranged to set the handover preference information element in response to which of the first radio network and the second radio network the handover preference message is forwarded to.

4. The communication system of claim 3 wherein the setting means comprises:
 means for receiving the handover preference message from the first radio network, the handover preference information element having indicating a preference for the first radio network;
 means for setting the handover preference information element of the handover preference message to a preference for the second radio network; and
 means for forwarding the handover preference message to the second radio network,
 wherein the first means is arranged to forward the handover preference message to the setting means in response to a decision to handover the remote station from the first radio network to the second radio network.

5. The communication system of claim 1 wherein the first means is arranged to determine if a handover is needed in response to a first criterion for a first setting of the handover preference information element and in response to a different criterion for a different setting of the handover preference indication.

6. The communication system of claim 1 wherein possible values of the handover preference information element furthermore comprises at least one value selected from the group of:
 a handover preference for the remote station to remain on the second radio network;
 a handover preference for the remote station to remain on the first radio network; and
 an indication that handover to the second radio network is not allowed.

7. A method of routing data between first and second radio networks in a communication system having a core network, a first radio network supporting a first air interface standard and comprising first means for receiving a handover preference message from the core network and for determining a handover in response to the handover preference message, and a second radio network supporting a second air interface standard and comprising second means for receiving the handover preference message from the core network and for determining a handover in response to the handover preference message; the method comprising the step of:
 setting a handover preference information element of the handover preference message such that, when the first means and second means receive the same handover preference information element, the first means biases handover decisions towards a remote station being supported by the first radio network and the second means biases handover decisions towards the remote station being supported by the second radio network such that setting controls any network in the system, using the same information element, to exhibit a preference to remain attached to an access layer of a radio network currently supporting the remote station instead of handing over in accordance with an interlayer handover preference for a specific access layer in a different radio network, wherein the first means is arranged to bias handover decisions towards a remote station being supported by the first radio network by initiating a handover to the second radio network only if a service of the remote station cannot be supported by the first radio network, and wherein the first means is arranged to determine a handover for a service in response to a nominal handover preference if no handover preference message is received for the service, wherein the nominal handover preference for a service type is determined in response to at least one characteristic of a radio access bearer supporting the service type.

* * * * *

UNITED STATES PATENT AND TRADEMARK OFFICE
CERTIFICATE OF CORRECTION

PATENT NO. : 8,355,379 B2
APPLICATION NO. : 12/278284
DATED : January 15, 2013
INVENTOR(S) : Thomas et al.

Page 1 of 1

It is certified that error appears in the above-identified patent and that said Letters Patent is hereby corrected as shown below:

On the Title Page, in Item (57), under "ABSTRACT", in Column 2, Line 13, delete "preference indication" and insert -- preference information element --, therefor at each occurrence throughout the Patent.

In the Specification

In Column 4, Line 28, delete "in'response" and insert -- in response --, therefor.

Signed and Sealed this
Sixteenth Day of July, 2013

Teresa Stanek Rea
*Acting Director of the United States Patent and Trademark Office*